(12) United States Patent
Shirai et al.

(10) Patent No.: US 11,960,836 B2
(45) Date of Patent: Apr. 16, 2024

(54) INDEX VALUE GIVING APPARATUS, INDEX VALUE GIVING METHOD AND PROGRAM

(71) Applicant: NIPPON TELEGRAPH AND TELEPHONE CORPORATION, Tokyo (JP)

(72) Inventors: Yoshinari Shirai, Tokyo (JP); Tessei Kobayashi, Tokyo (JP); Sanae Fujita, Tokyo (JP); Masafumi Matsuda, Tokyo (JP); Yasue Kishino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 391 days.

(21) Appl. No.: 17/442,524

(22) PCT Filed: Mar. 11, 2020

(86) PCT No.: PCT/JP2020/010508
§ 371 (c)(1),
(2) Date: Sep. 23, 2021

(87) PCT Pub. No.: WO2020/195823
PCT Pub. Date: Oct. 1, 2020

(65) Prior Publication Data
US 2022/0171924 A1  Jun. 2, 2022

(30) Foreign Application Priority Data
Mar. 25, 2019 (JP) ................................. 2019-056163

(51) Int. Cl.
*G06F 40/237* (2020.01)
*G06F 3/0484* (2022.01)
*G06F 16/22* (2019.01)

(52) U.S. Cl.
CPC .......... *G06F 40/237* (2020.01); *G06F 3/0484* (2013.01); *G06F 16/2228* (2019.01)

(58) Field of Classification Search
CPC .... G06F 40/247; G06F 16/353; G06F 16/374; G06F 16/335; G06F 40/242;
(Continued)

(56) References Cited

U.S. PATENT DOCUMENTS 11,783,950 B2 * 10/2023 Pauly .................... G06N 3/045
705/3
11,829,725 B2 * 11/2023 Tunstall-Pedoe ....... G10L 15/22
(Continued)

FOREIGN PATENT DOCUMENTS

CA        3039551 A1 *  5/2018  ........... B27B 29/085
CN      110020438 A  *  7/2019  ........... G06F 17/278
(Continued)

OTHER PUBLICATIONS

Sato et al. (2004) "Fundamental Vocabulary Selection Based on Word Familiarity" Journal of the Japanese Society for Artificial Intelligence, vol. 19, No. 6F, pp. 502-510.

*Primary Examiner* — Mohammad K Islam

(57) ABSTRACT

An index value assignment device comprises: a selection unit that prompts a user to select, from a sentence, one or more words that the user feels to have a same degree of a predetermined index value with respect to one or more first words for which the index value is known; a validation unit that validates the selection result by the user on a basis of the index value of a second word for which the index value is known from among the one or more words included in the selection result; and a determination unit that determines the index value with respect to a third word for which the index value is unknown from among the one or more words selected by the user, on a basis of the index value of the first word according to the selection result for which the selection (Continued)

result is determined to be valid. Consequently, the efficiency of assigning word familiarity is increased.

18 Claims, 12 Drawing Sheets

(58) Field of Classification Search
CPC .. G06F 40/295; G06F 40/237; G06F 16/2228; G06F 3/0484; G06F 16/9035; G06F 11/3466; G16H 50/70; G06N 20/00; G06N 3/08
See application file for complete search history.

(56) References Cited

U.S. PATENT DOCUMENTS

| | | | |
|---|---|---|---|
| 2015/0279358 A1* | 10/2015 | Kingsbury | G10L 15/02 704/257 |
| 2020/0050941 A1* | 2/2020 | Zhuang | G06N 3/044 |
| 2021/0109995 A1* | 4/2021 | Mihindukulasooriya | G06F 40/247 |
| 2022/0027756 A1* | 1/2022 | Mac Manus | G06N 5/04 |
| 2023/0316408 A1* | 10/2023 | Khan | G06Q 40/08 705/2 |

FOREIGN PATENT DOCUMENTS

| | | | | |
|---|---|---|---|---|
| CN | 111625659 A | * | 9/2020 | ........... G06F 16/367 |
| CN | 112840336 A | * | 5/2021 | ....... G06F 16/24573 |
| JP | 4571404 B2 | * | 10/2010 | ........... G06F 16/374 |
| WO | WO-2020193966 A1 | * | 10/2020 | ........... G06F 40/295 |

\* cited by examiner

Fig. 1

FROM THE FOLLOWING SENTENCE, CHOOSE 5 WORDS THAT WOULD FEEL AS FAMILIAR TO ORDINARY PEOPLE AS "KUMEN (CONTRIVE)"

Fig. 3

QUESTION WORD: KUMEN (CONTRIVE) (5.5)

ANSWER WORDS:
- KUNIMOTO (BIRTHPLACE) (4.5)
- KANJIN (UNDEFINED)
- SAKERU (TO AVOID) (5.8)
- DAKARA (BECAUSE) (5.7)
- FUJIYUU (INCONVENIENT) (4.7)

Fig. 4

| QUESTION WORD | WORD FAMILI-ARITY | ANSWER WORD | WORD FAMILI-ARITY | ANSWER WORD | WORD FAMILI-ARITY | ANSWER WORD | WORD FAMILI-ARITY | ANSWER WORD | WORD FAMILI-ARITY | ANSWER WORD | SCORE |
|---|---|---|---|---|---|---|---|---|---|---|---|
| KOMANDO (COMMAND) | 5.438 | KUSHIN (PAINS) | UNDEFINED | JIKKOU (EXECUTE) | 6.094 | SETTEI (SET) | 5.875 | HENSHUU (EDIT) | 6.031 | BAKKUAPPU (BACKUP) | 1.779359 |
| KOMANDO (COMMAND) | 5.438 | BAKKUAPPU (BACKUP) | 6.031 | SETTEI (SET) | 5.875 | KUSHIN (PAINS) | UNDEFINED | PAKKEEJI (PACKAGE) | 6.094 | JIKKOU (EXECUTE) | 1.663894 |
| KIDOU (LAUNCH) | 5.062 | KUSHIN (PAINS) | UNDEFINED | SETTEI (SET) | 5.875 | SHOKI (INITIAL) | 5.938 | HENSHUU (EDIT) | 6.031 | BAKKUAPPU (BACKUP) | 1.112347 |
| KARA (PARTICLE) | 5.125 | HENSHUU (EDIT) | 6 | KUSHIN (PAINS) | UNDEFINED | JIKKOU (EXECUTE) | 6.094 | SETTEI (SET) | 5.875 | REI (EXAMPLE) | 1.066667 |
| DOU (HOW) | 5.344 | YOI (GOOD) | 6.469 | HENSHUU (EDIT) | 6 | KUSHIN (PAINS) | UNDEFINED | JIKKOU (EXECUTE) | 6.094 | SURU (TO DO) | 1.185302 |
| IN (IN) | 5.235 | KUSHIN (PAINS) | UNDEFINED | FAIRU (FILE) | 6.219 | PAKKEEJI (PACKAGE) | 6.156 | KOMANDO (COMMAND) | 5.438 | BAKKUAPPU (BACKUP) | 1.37741 |
| KIDOU (LAUNCH) | 5.062 | HENSHUU (EDIT) | 6 | SHOKI (INITIAL) | 5.938 | JIKKOU (EXECUTE) | 6.094 | KUSHIN (PAINS) | 0.5 | HITSUYOU (NECESSARY) | 0.933707 |
| KIDOU (LAUNCH) | 5.062 | HITSUYOU (NECESSARY) | 0.5 | KUSHIN (PAINS) | UNDEFINED | HENSHUU (EDIT) | 6 | SETTEI (SET) | 5.875 | KIJUTSU (DESCRIBE) | 1.07498 |
| KIDOU (LAUNCH) | 5.062 | KONKAI (THIS TIME) | 6.312 | HISSU (ESSENTIAL) | 5.25 | PAKKEEJI (PACKAGE) | 6.156 | KUSHIN (PAINS) | 0.5 | HOUHOU (METHOD) | 1.007557 |
| GAIDORAIN (GUIDELINE) | 5.062 | KUSHIN (PAINS) | UNDEFINED | BAAJON (VERSION) | 0 | TSUUSHIN (COMMUNICATE) | 6.125 | FUZOKU (ATTACHED) | 5.625 | SAISHIN (NEWEST) | 1.142204 |
| KANSUU (FUNCTION) | 5.125 | KUSHIN (PAINS) | UNDEFINED | IZEN (BEFORE) | 6.156 | KENGEN (AUTHORITY) | 5.094 | SHUTOKU (ACQUIRE) | 5.719 | TSUGI (NEXT) | 1.506024 |

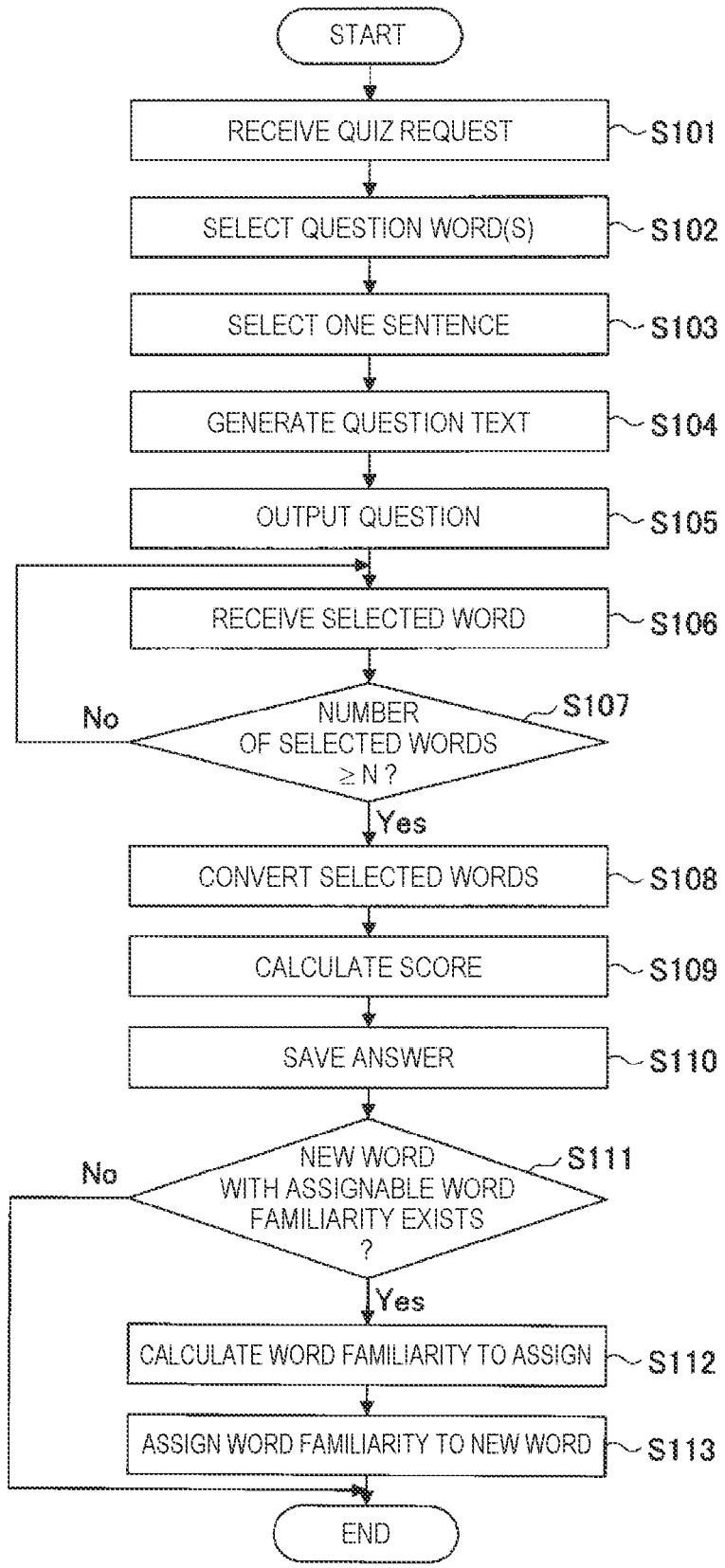

Fig. 8

| QUESTION WORD | WORD FAMILI-ARITY | ANSWER WORD | WORD FAMILI-ARITY | ANSWER WORD | WORD FAMILI-ARITY | ANSWER WORD | WORD FAMILI-ARITY | ANSWER WORD | WORD FAMILI-ARITY | ANSWER WORD |
|---|---|---|---|---|---|---|---|---|---|---|
| KOMANDO (COMMAND) | 5.438 | KUSHIN (PAINS) | UNDEFINED | JIKKOU (EXECUTE) | 6.094 | SETTEI (SET) | 5.875 | HENSHUU (EDIT) | 6 | BAKKUAPPU (BACKUP) | 6.031 |
| KOMANDO (COMMAND) | 5.438 | BAKKUAPPU (BACKUP) | 6.031 | SETTEI (SET) | 5.875 | KUSHIN (PAINS) | UNDEFINED | PAKKEEJI (PACKAGE) | 6.156 | JIKKOU (EXECUTE) | 6.094 |
| KOMANDO (COMMAND) | 5.438 | KUSHIN (PAINS) | UNDEFINED | SETTEI (SET) | 5.875 | SHOKI (INITIAL) | 5.938 | HENSHUU (EDIT) | 6 | BAKKUAPPU (BACKUP) | 6.031 |
| KOMANDO (COMMAND) | 5.438 | HENSHUU (EDIT) | 6 | KUSHIN (PAINS) | UNDEFINED | JIKKOU (EXECUTE) | 6.094 | SETTEI (SET) | 5.875 | REI (EXAMPLE) | 6.281 |
| KOMANDO (COMMAND) | 5.438 | YOI (GOOD) | 6.469 | HENSHUU (EDIT) | 6 | KUSHIN (PAINS) | UNDEFINED | JIKKOU (EXECUTE) | 6.094 | SURU (TO DO) | UNDEFINED |

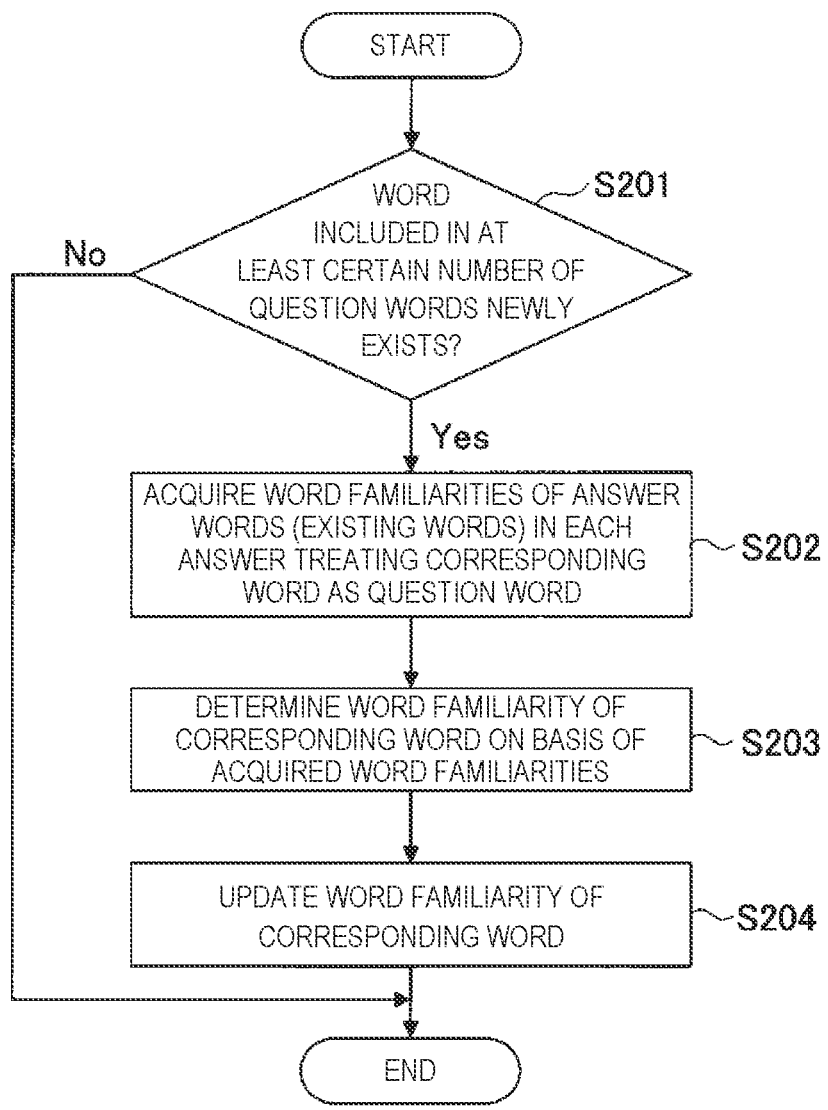

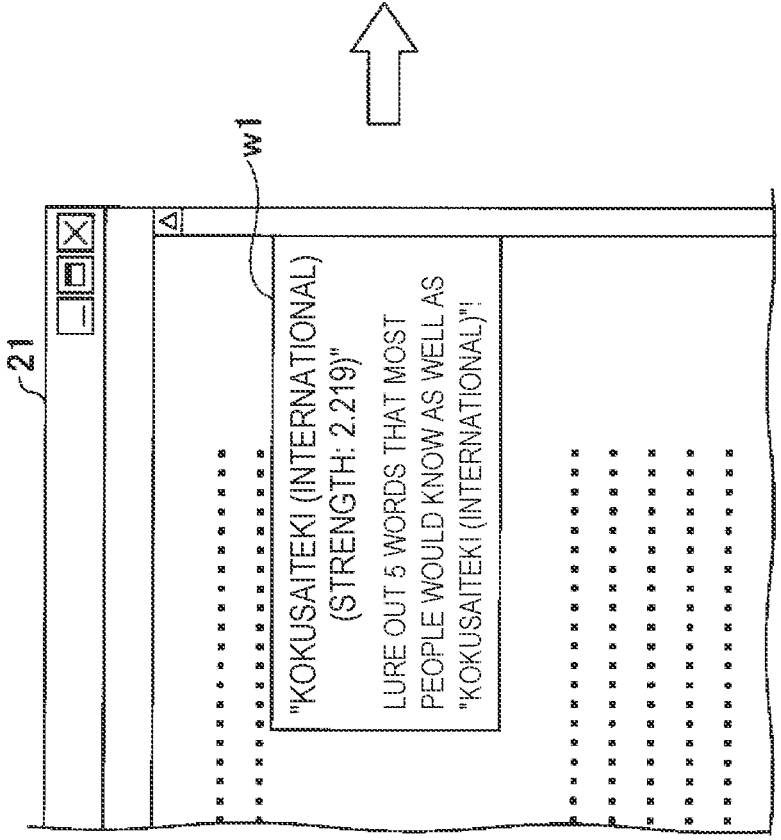
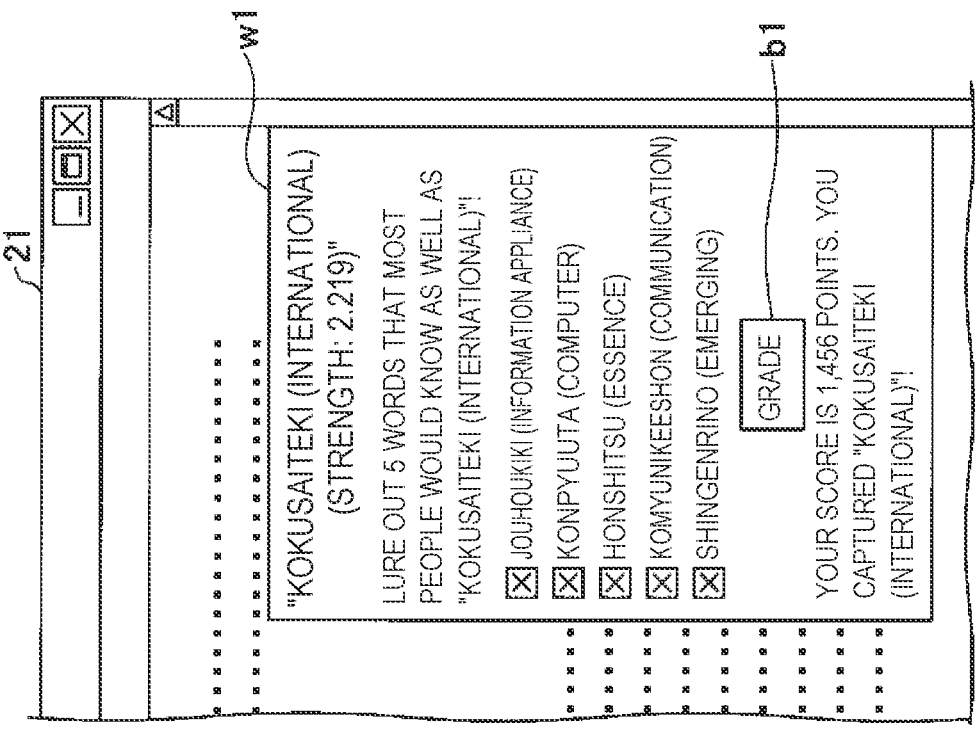
Fig. 10

INDEX VALUE GIVING APPARATUS, INDEX VALUE GIVING METHOD AND PROGRAM

CROSS-REFERENCE TO RELATED APPLICATIONS

This application is a U.S. 371 Application of International Patent Application No. PCT/JP2020/010508, filed on 11 Mar. 2020, which application claims priority to and the benefit of JP Application No. 2019-056163, filed on 25 Mar. 2019, the disclosures of which are hereby incorporated herein by reference in their entireties.

TECHNICAL FIELD

The present invention relates to an index value assignment device, an index value assignment method, and a program.

BACKGROUND ART

Word familiarity is a rating that represents the subjective familiarity of a word as a real number ranging from 1 to 7 (see Non-Patent Literature 1). A word familiarity closer to 1 indicates a less-familiar word, while a word familiarity closer to 7 indicates a more-familiar word. Word familiarity databases are already publicly available and widely used.

CITATION LIST

Non-Patent Literature

Non-Patent Literature 1: Sato Hiroshi, Kasahara Kaname, Kanasugi Tomoko, and Amano Shigeaki, "Fundamental Vocabulary Selection based on Word Familiarity", The Japanese Society for Artificial Intelligence, Vol. 19, No. 6, pp. 502-510, 2004.

SUMMARY OF THE INVENTION

Technical Problem

However, word familiarity databases are not necessarily updated continuously to reflect words that are newly created with the times. This is because assigning word familiarity requires at least a certain number of test subjects having at least a certain level of vocabulary to assign the word familiarity (see Non-Patent Literature 1), which is costly. Moreover, word familiarity changes with the times, making it necessary to also revise word familiarity values assigned in the past, but the numerical values cannot be updated easily for reasons similar to the above.

Recently, it has become possible to use crowdsourcing to distribute work to a large number of people relatively easily, but requesting work normally requires monetary compensation, and the problem of cost is still unresolved.

In light of the above points, an object of the present invention is to increase the efficiency of assigning word familiarity.

Means for Solving the Problem

Accordingly, to solve the above problem, an index value assignment device comprises: a selection unit that prompts a user to select, from a sentence, one or more words that the user feels to have a same degree of a predetermined index value with respect to one or more first words for which the index value is known; a validation unit that validates the selection result by the user on a basis of the index value of a second word for which the index value is known from among the one or more words included in the selection result; and a determination unit that determines the index value with respect to a third word for which the index value is unknown from among the one or more words selected by the user, on a basis of the index value of the first word according to the selection result for which the selection result is determined to be valid.

Effects of the Invention

The efficiency of assigning word familiarity can be increased.

BRIEF DESCRIPTION OF DRAWINGS

FIG. 1 is a diagram illustrating an example of a question set as a quiz.

FIG. 3 is a diagram illustrating an example of a word familiarity acquisition result.

FIG. 4 is a diagram for explaining an example of calculating word familiarity based on example answers.

FIG. 7 is a flowchart for explaining an example of a processing procedure executed by the server device 10 in the first embodiment.

FIG. 8 is a diagram illustrating an example of an answer group for explaining a second embodiment.

FIG. 9 is a flowchart for explaining an example of a processing procedure executed by an update unit 16 in the second embodiment.

FIG. 10 is a diagram illustrating how a quiz for updating word familiarity is performed on a web page in a third embodiment.

DESCRIPTION OF EMBODIMENTS

Hereinafter, embodiments of the present invention will be described on the basis of the drawings. In the embodiments, a quiz related to word familiarity is set, and word familiarity is assigned or updated on the basis of answers to the quiz.

FIG. 1 is a diagram illustrating an example of a question set as a quiz. The quiz illustrated in FIG. 1 asks the quiz-taker to choose words that would feel as familiar to ordinary people as a certain word (in FIG. 1, "kumen (contrive)") from a displayed sentence. It is assumed that the word familiarity is already assigned (the word familiarity is known) for the word displayed as the question (in FIG. 1, "kumen (contrive)"). In FIG. 1, the single word "kumen (contrive)" is presented to a user as the question word, but a plurality of words having nearly the same word familiarity may also be presented as question words to make it easier for the user to perceive the word familiarity of the word in the question (hereinafter referred to as the "question word"). Note that in FIG. 1, the sentence is represented by " . . . " for convenience.

Figure 2:
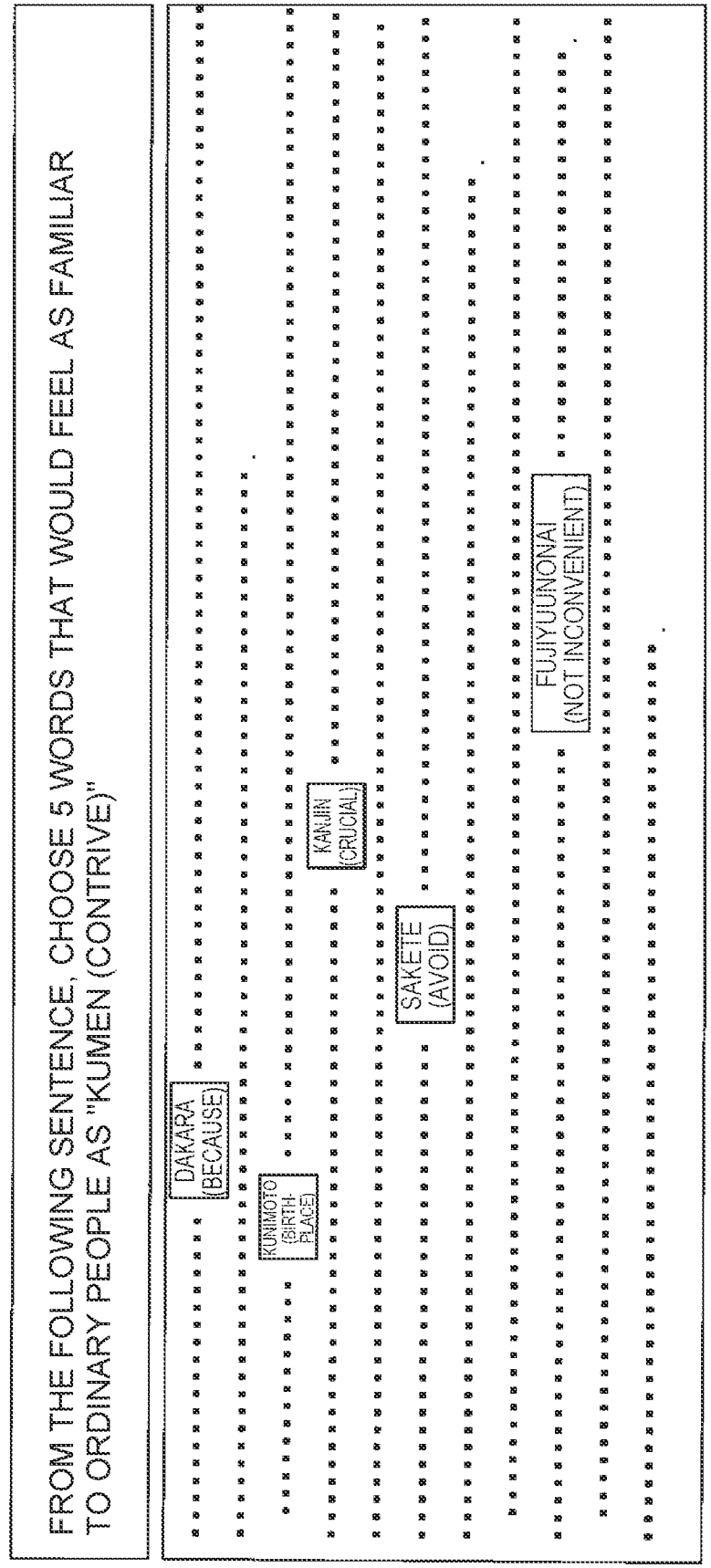
FIG. 2 is a diagram illustrating an example of an answer to the quiz.

FIG. 2 is a diagram illustrating an example of an answer to the quiz. The user answers the quiz by selecting, such as by clicking, words that appear in the sentence. In FIG. 2, words selected by the user as words that would feel as familiar to ordinary people as "kumen (contrive)" (that is, words that the user feels to have the same degree of word familiarity as "kumen (contrive)") are enclosed by rectangular borders. Specifically, an example in which "kunimoto (birthplace)", kanjin (crucial)", sakete (avoid)", "dakara (because)", and "fujiyuunonai (not inconvenient)" have been selected as corresponding words is illustrated.

By having many users answer many such quiz questions, words without an assigned word familiarity (words whose word familiarity is unknown; hereinafter referred to as "new words") can be assigned a word familiarity, and words already having an assigned word familiarity (words whose word familiarity is known; hereinafter referred to as "existing words") can be assigned an updated word familiarity.

Specifically, the words that are selected (hereinafter referred to as the "selected words") are first converted into a format that can be referenced by a word familiarity database (a word familiarity DB 122 described later). Specifically, if the user-selected word is long, morphological analysis is executed, and only the leading morpheme is evaluated as an answer. For example, "fujiyuunonai (not inconvenient)" is converted into "fujiyuu (inconvenient)". Also, to compare with the word familiarity DB 122, the inflection is reverted to the base form. For example, "sakete (avoid)" is converted into "sakeru (to avoid)".

The word familiarity of the words obtained by these conversion processes (hereinafter referred to as the "answer words") is acquired from the word familiarity DB 122. However, selected words that do not need conversion processing are treated as answer words as-is, and the word familiarity is acquired from the word familiarity DB 122.

FIG. 3 is a diagram illustrating an example of a word familiarity acquisition result. In FIG. 3, the word familiarity corresponding to the question word and each answer word is indicated in parentheses. Note that the word familiarities in the diagram are convenient values, and do not reflect actual word familiarities.

In this example, the word "kanjin (crucial)" is a new word that does not exist in the word familiarity DB 122, while the other words are existing words. Consequently, the word familiarity for "kanjin (crucial)" is set to "undefined".

At this point, if the user has attempted to answer the question seriously, the validity of the answer provided by the user is expected to be high. That is, words that would feel as familiar to ordinary people as the question word, or in other words, words having substantially the same word familiarity as the question word are expected to be chosen as the answer words. Accordingly, in the first embodiment, the word familiarity for each new word in the answer is determined (the word familiarity is assigned to each new word) on the basis of the word familiarity of the question word. Specifically, in the example of FIG. 3, the word familiarity "5.5" for "kumen (contrive)" is assigned to the word "kanjin (crucial) ". In the case where a plurality of words having slightly different word familiarities are presented as the question, a value such as the average value of the word familiarity for the word group may be assigned to each new word.

However, if the user does not attempt to answer the question seriously, this assumption fails, and the validity of the answer provided by the user is lowered. Accordingly, to determine whether or not the user has attempted to answer the question seriously (that is, to validate the answer provided by the user), a score based on the answer result is computed, and if the score is a threshold value or higher, it is determined that the user has attempted to answer the question seriously (the answer provided by the user is valid), and a word familiarity is assigned to each new word. On the other hand, if the score is lower than the threshold value, it is determined that the user has no attempted to answer the question seriously (the answer provided by the user is not valid), and a word familiarity is not assigned to each new word. Note that even if a user attempts to answer the question seriously, it is conceivable that the validity of the user's answer may change depending on factors such as the user's vocabulary. Also, it is conceivable that the difficulty of the question may change depending on how many existing words and how many new words are included in the sentence contained in the question, and as a result, the validity of the answer provided by the user may also change.

An example of a formula for calculating the score is given below.

[Math. 1]

$$\text{Score} = \frac{n}{\sum_{i=1}^{N} |F_i - F_q|} \quad (1)$$

where
  $F_i$: word familiarity of word (existing word) in answer from user (excluding new words)
  $F_q$: word familiarity of question word
  n: number of existing words (other than words with undefined word familiarity) among answer words
  N: number of selected words
Also,
  Case where word i is a new word: $|F_i - F_q| = 0$ According to Expression (1), the closer the word familiarity of the answer word group is to the word of the question word, the higher the score. For example, the score in the case of FIG. 3 is approximately 1.74. Here, assuming that the threshold value is 1.6, in the example of FIG. 3, the score is higher than the threshold value, and therefore the answer provided by the user is determined to be valid. Consequently, in this case, the word familiarity (5.5) assigned to "kumen (contrive)" is assigned to the word "kanjin (crucial) ".

Note that although Expression (1) is designed so that the score rises as the word familiarity of the answer word group approaches the word familiarity of the question word, but the denominator and the numerator may also be reversed so that the score becomes smaller as the word familiarity of the answer word group approaches the word familiarity of the question word. In this case, the answer provided by the user is determined to be valid if the score is lower than the threshold value.

In the present embodiment, the word familiarity is assigned to a new word from a single answer for simplicity, but in actuality, the word familiarity for a new word may be determined on the basis of an average of a plurality of answers. For example, answers whose score exceeds a threshold value are extracted from an answer group in which the word "kanjin (crucial)" is selected as an answer, and the average of the word familiarity for the question word of each extracted answer is assigned as the word familiarity of the word "kanjin (crucial)". The formula for the word familiarity in this case is as follows.

[Math. 2]
$$\text{Word Familiarity} = \frac{\sum F_q}{n} \quad (2)$$

Additionally, a weighted average of the word familiarities of the question words treating the scores as the weights may also be taken as the word familiarity of the new word.

[Math. 3]
$$\text{Word Familiarity} = \frac{\sum F_q S_c}{\sum S_c} \quad (3)$$

Note that in Expressions (2) and (3),
$F_q$: word familiarity of question word
n: number of answers having score equal to or greater than threshold value
$S_c$: score As an example, in the case where the word "kushin (pains)" is included in 11 answers like in FIG. 4, 5.438 is assigned to "kushin (pains)" as the word familiarity (determined as the word familiarity of "kushin (pains)") in the case of using the average of the word familiarity of each question word in the answers equal to or greater than the threshold value (1.6), whereas 5.209 is assigned in the case of using a weighted average of the word familiarity of each question word.

Hereinafter, a server device 10 that assigns word familiarity as above will be described.

Figure 5:
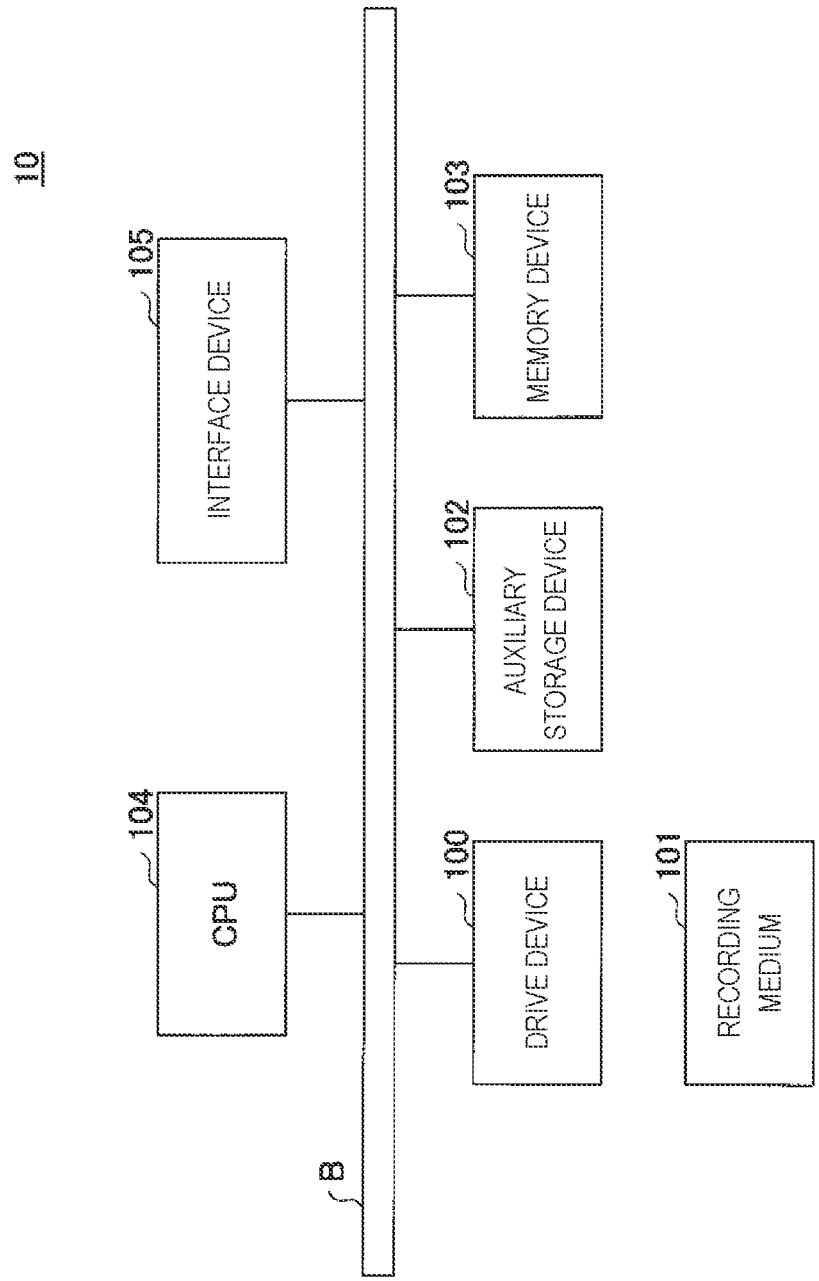
FIG. 5 is a diagram illustrating an example of a hardware configuration of a server device 10 according to a first embodiment.

FIG. 5 is a diagram illustrating an example of a hardware configuration of the server device 10 according to the first embodiment. The server device 10 in FIG. 5 includes components such as a drive device 100, an auxiliary storage device 102, a memory device 103, a CPU 104, and an interface device 105, which are interconnected by a bus B.

A program that achieves processing on the server device 10 is provided by a recording medium 101 such as a CD-ROM disc. When the recording medium 101 that stores the program is placed in the drive device 100, the program is installed from the recording medium 101 to the auxiliary storage device 102 through the drive device 100. However, the program does not necessarily have to be installed from the recording medium 101, and may also be downloaded from another computer over a network. The auxiliary storage device 102 stores the installed program, and also stores information such as necessary files and data.

When an instruction to launch the program is given, the memory device 103 reads out and stores the program from the auxiliary storage device 102. The CPU 104 executes functions related to the server device 10 by following the program stored in the memory device 103. The interface device 105 is used as an interface for connecting to a network.

Figure 6:
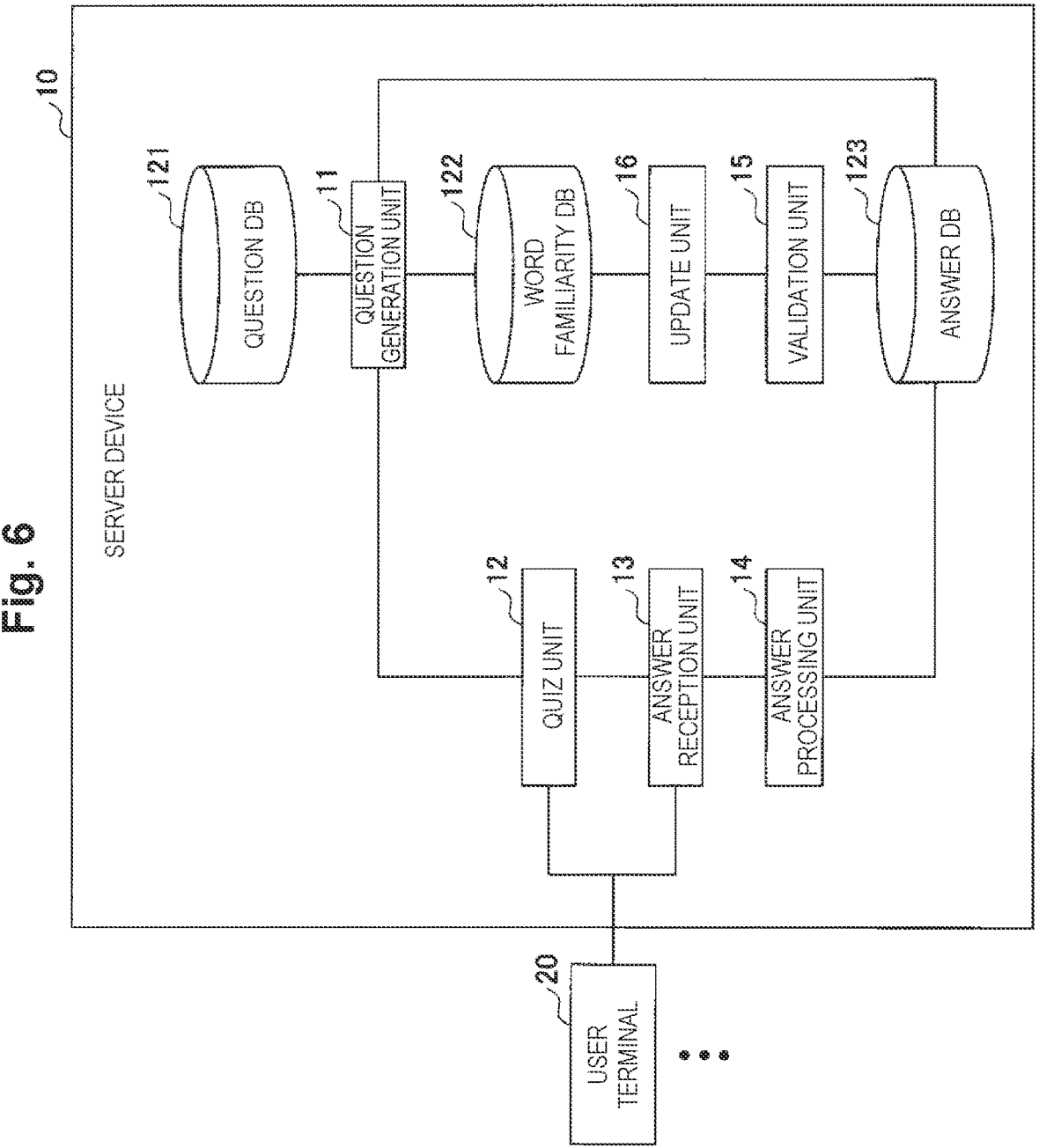
FIG. 6 is a diagram illustrating an example of a functional configuration of the server device 10 according to the first embodiment.

FIG. 6 is a diagram illustrating an example of a functional configuration of the server device 10 according to the first embodiment. In FIG. 6, the server device 10 includes functions such as a question generation unit 11, a quiz unit 12, an answer reception unit 13, an answer processing unit 14, a validation unit 15, and an update unit 16. These units are achieved by a process of causing the CPU 104 to execute one or more programs installed in the server device 10. Additionally, the server device 10 uses databases (storage units) such as a question DB 121, a word familiarity DB 122, and an answer DB 123. These databases are achievable using a component such as the auxiliary storage device 102 or a storage device connectible to the server device 10 over a network, for example.

Note that the server device 10 is connected to a plurality of user terminals 20 over a network such as the Internet.

Hereinafter, a processing procedure executed by the server device 10 in the first embodiment will be described. FIG. 7 is a flowchart for explaining an example of a processing procedure executed by the server device 10 in the first embodiment. The processing procedure in FIG. 7 is executed according to a quiz request from one of the plurality of user terminals 20.

When a quiz request is received from one of the user terminals 20 (S101), the quiz unit 12 outputs the quiz request to the question generation unit 11.

The question generation unit 11 accepts the input of the quiz request output from the quiz unit 12, and selects, as a question word, one or a plurality of existing words from among the existing words having an assigned word familiarity and stored in the word familiarity DB 122 (S102). Note that in the case where a plurality of existing words are selected as question words, existing words having substantially the same word familiarity (such that the difference between the maximum value and the minimum value is within a predetermined value or the variance is within a predetermined value, for example) are selected.

Next, from a sentence group stored in the question DB 121, the question generation unit 11 selects a sentence (hereinafter referred to as the "target sentence") containing (N−1) or more words close to the word familiarity of the selected question word(s) (that is, the difference between the word familiarities is within a predetermined value) and also containing at least a certain number of new words (S103). Note that N is the number of answers sought from the user.

For example, if a sentence containing 10 or more words having a word familiarity difference of less than 0.5 with the question word(s) and also containing 10 or more new words is selected, the probability that the user will select at least four existing words and select at least one new word is thought to be high. Consequently, in this case, the user is sufficiently capable of meeting or exceeding the threshold value 1.6.

Note that a sentence group is stored in advance in the question DB 121. Also, in the word familiarity DB 122, the word familiarity or each word that appears in at least one sentence among the sentence group is stored an advance. However, for a word which is a new word, a numerical value (−1 for example) indicating that the word is a new word may be stored in the word familiarity DB 122, or the word itself does not have to be stored in the word familiarity DB 122. Because, in either case, it possible to distinguish such a word as a new word.

Next, the question generation unit 11 generates question text (S104). The question text is generated by embedding the question word(s) into a predetermined template. The template is a sentence such as "From the following sentence, choose N words that would feel as familiar to ordinary people as W", where the question word(s) selected in step S102 are embedded into the W portion, and the number of answers sought from the user is embedded into the N portion. The question generation unit 11 outputs the question word(s), the generated question text, and the target sentence to the quiz unit 12.

Next, the quiz unit 12 accepts the input of the question text and the target sentence output from the question generation unit 11, and transmits (outputs) a quiz including the question text and the target sentence to the user terminal 20 from which the quiz request originated (S105), and also outputs the question word (s) to the answer reception unit 13. As a result, the question text and the target sentence are displayed on the user terminal 20, as illustrated in FIG. 1. The user follows the question text and selects words (inputs selected words) from the target sentence as an answer. Every time a selected word is input (every time a word is selected from the target sentence), the user terminal 20 transmits the selected word to the server device 10.

Every time a selected word (selection result) is received (S106), the answer reception unit 13 determines whether or not the number of selected words has reached the number N sought as an answer (S107). If the number of selected words has reached N (S107, Yes), the answer reception unit 13 outputs all of the selected words and the question word(s) output from the Quiz unit 12 to the answer processing unit 14.

Next, the answer processing unit 14 executes the process of converting each selected word output from the answer reception unit 13 into an answer word described above (S108). Next, the answer processing unit 14 calculates a score for the current answer (S109). The score calculation method is as described above. Note that the word familiarity for existing words among the answer words is acquired from the word familiarity DB 122. On the other hand, the word familiarity for new words among the answer words is "undefined".

Next, the answer processing unit 14 saves a record containing the question word(s), each answer word, the word familiarity of each answer word, and the score in the answer DB 123 (S110). Note that the answer DB 123 has a configuration like the one illustrated in FIG. 4.

The validation unit 15 monitors updates to the answer DB 123. When a new record is registered in the answer DB 123, the validation unit 15 determines whether or not a new word with an assignable word familiarity exists among the new words having an "undefined" word familiarity in the answer DB 123 (S111). For example, for a certain new word, if answers containing the new word as an answer word exist, and the total number of answers whose score is a threshold value or higher (hereinafter referred to as "target answers") is α or greater (where α≥1), it is determined that the word familiarity is as to the new word.

In the case where a new word with an assignable word familiarity does not exist (S111, No), the subsequent processes are not executed. In the case where a new word with an assignable word familiarity exists (S111, Yes), the validation unit 15 outputs the new word, the scores of all target answers associated with the new word, and the word familiarity of each answer word (existing word) in each target answer to the update unit 16.

The update unit 16 accepts the input of the new word, the score of each target word, and the word familiarity of each answer word (existing word) in each target answer output from the validation unit 15, and substitutes the word familiarities into Expression (2) or substitutes the word familiarities and the score of each target answer into Expression (3) to calculate (determine) the word familiarity for the new word (S112). Note that in the case where a plurality of new words are output from the validation unit 15, the word familiarity is calculated (determined) for each new word.

Next, the update unit 16 assigns the word familiarity calculated with respect to each new word to each new word (S113). Specifically, the calculated word familiarity is saved in the word familiarity DR 122 in association with each new word.

Note that in the answer DB 123, the update unit 16 may also update the word familiarity of each new word from "undefined" to a value (such as "defined", for example) indicating that a word familiarity has been assigned to each new word. The value may also be the word familiarity itself. This configuration makes it possible to avoid repeating the same process (the process for assigning the word familiarity) on the same new word.

Note that the steps from step S111 do not necessarily have to be executed at the same time as the steps up to step S110. For example, the steps from step S111 may also executed periodically.

To encourage the user to continue performing the work of assigning word familiarity, it is necessary to sustain the user's motivation, such as by making the assigning work feel fun. Accordingly, for example, user engagement may be elicited through methods such as displaying a score for the user, granting points for performing at least a certain amount of work, and displaying a ranking comparing the user's performance (computed from the points and the score) to other users.

Additionally, by gamifying the work of assigning word familiarity as a sub-task within a game, if the main task of the game is interesting, the probability that the user will continue to perform the work of assigning word familiarity rises. For example, in the present embodiment, when a score at or above a threshold value is achieved, the question words can be saved in a collection. The collected words may be personified, and a game may be realized in which the collected words can be sent into combat against words owned by other users, or nurtured and powered up, for example. As a result, it is anticipated that users will proactively answer questions in order to collect a variety of words and obtain strong words (for example, words with a low word familiarity are given strong attributes when fighting against the words).

Note that although the above illustrates an example in which the number of words that the user is asked to select (number of answers) is 5, but the number of answers is not limited to 5. However, care should be taken because if the number is too small, validation of the user's answer is difficult.

Next, a second embodiment will be described. In the second embodiment, the points that differ from the first embodiment will be described. Points not specifically mentioned in the second embodiment may be similar to the first embodiment. In the first embodiment, a method of assigning the word familiarity to a new word (a method of determining the word familiarity of a new word) is described, but in the second embodiment, an example of updating the word familiarity assigned to an existing word will be described.

FIG. 8 is a diagram illustrating an example of an answer group for explaining the second embodiment. In FIG. 8, an answer group with respect to a quiz treating "komando (command)" as the question word (that is, an answer group with respect to the same question word) is illustrated. The second embodiment describes an example of updating (determining) the word familiarity of a word treated as the question word in a plurality of questions, like "komando (command)" in FIG. 8, on the basis of the word familiarity of the answer words with respect to each question. To achieve such updating, in the second embodiment, the update unit 16 of the server device 10 executes the processing procedure illustrated in FIG. 9.

FIG. 9 is a flowchart for explaining an example of a processing procedure executed by the update unit 16 in the second embodiment.

In step S201, the update unit 16 references the answer DB 123 to determine whether a word included among the question words in at least a certain number of questions newly exists. "Newly" means since the processing procedure in FIG. 9 was started in the case of a word whose word familiarity has not been updated before, or means since the last update in the case of a word whose word familiarity has been updated before.

In the case where such a word (hereinafter referred to as the "target word") exists (S201, Yes), the update unit 16 acquires the word familiarity of each answer word in the certain number of records (that is, a certain number of new records in the answer DB 123 that include the target word as the question word) (S202).

Next, the update unit 16 determines the word familiarity of the target word on the basis of the acquired word familiarity group (S203). For example, the update unit 16 may determine the average of the word familiarities as the word familiarity of the target word.

Next, the update unit 16 updates the word familiarity stored in the word familiarity DB 122 in association with the target word (that is, the word familiarity assigned to the target word) to the value determined in step S203 (S204).

In this way, by updating the word familiarity or an existing word, the word familiarity of each word that changes over time or with the times can be brought closer to the actual value.

Note that the update unit 16 may also limit the records to acquire in step S202 to records having a score equal to or greater than a threshold value.

Also, in step S203, the update unit 16 may be configured to determine the word familiarity of the target word in the case where all of the word familiarities included in the acquired word familiarity group are higher or lower than the word familiarity of the target word, and not change the word familiarity of the target word in other cases. This is because in the case where the entire word familiarity group is higher or lower than the word familiarity of the target word, the probability that the word familiarity of the target word has changed is thought to be high.

Next, a third embodiment will be described. In the third embodiment, the points that differ from the above embodiments will be described. Points not specifically mentioned in the third embodiment may be similar to the above embodiments.

In the first embodiment, it is necessary to prepare the question DB 121. To proceed with assigning word familiarities to new words, sentences containing at least a certain number of new words need to be accumulated in the question DB 121. The manual work of finding or creating such sentences to register in the question DB 121 is highly laborious.

On the other hand, numerous sentences containing new words exist on the Internet. A multitude of news articles, blogs, posts to social networking services (SNS), and the like reflecting social trends is uploaded to the World Wide Web (WWW) every day. Accordingly, in the fourth embodiment, a method of incorporating a mechanism of updating word familiarity into a web browser of the user terminal 20 is illustrated.

By using an extension (add-on) of a general browser, the entire text or a web page that the user viewing can be treated as possible selections for the answer, and on the basis of the selection result, word familiarities can be assigned to new words on the web page.

FIG. 10 is a diagram illustrating how a quiz for updating word familiarity is performed on a web page in the third embodiment. A situation is illustrated in which an extension program (add-on) of a web browser 21 of the user terminal 20 displays a question similar to the first embodiment in a window w1 on a web page, and a score is awarded on the basis of an answer by the user. If the sub-gamification described in the first embodiment performed, question words can be acquired (captured) if a good score is achieved. Note that the "strength" value in FIG. 10 is a value computed by using the word familiarity as a base, and is not the word familiarity itself.

Figure 11:
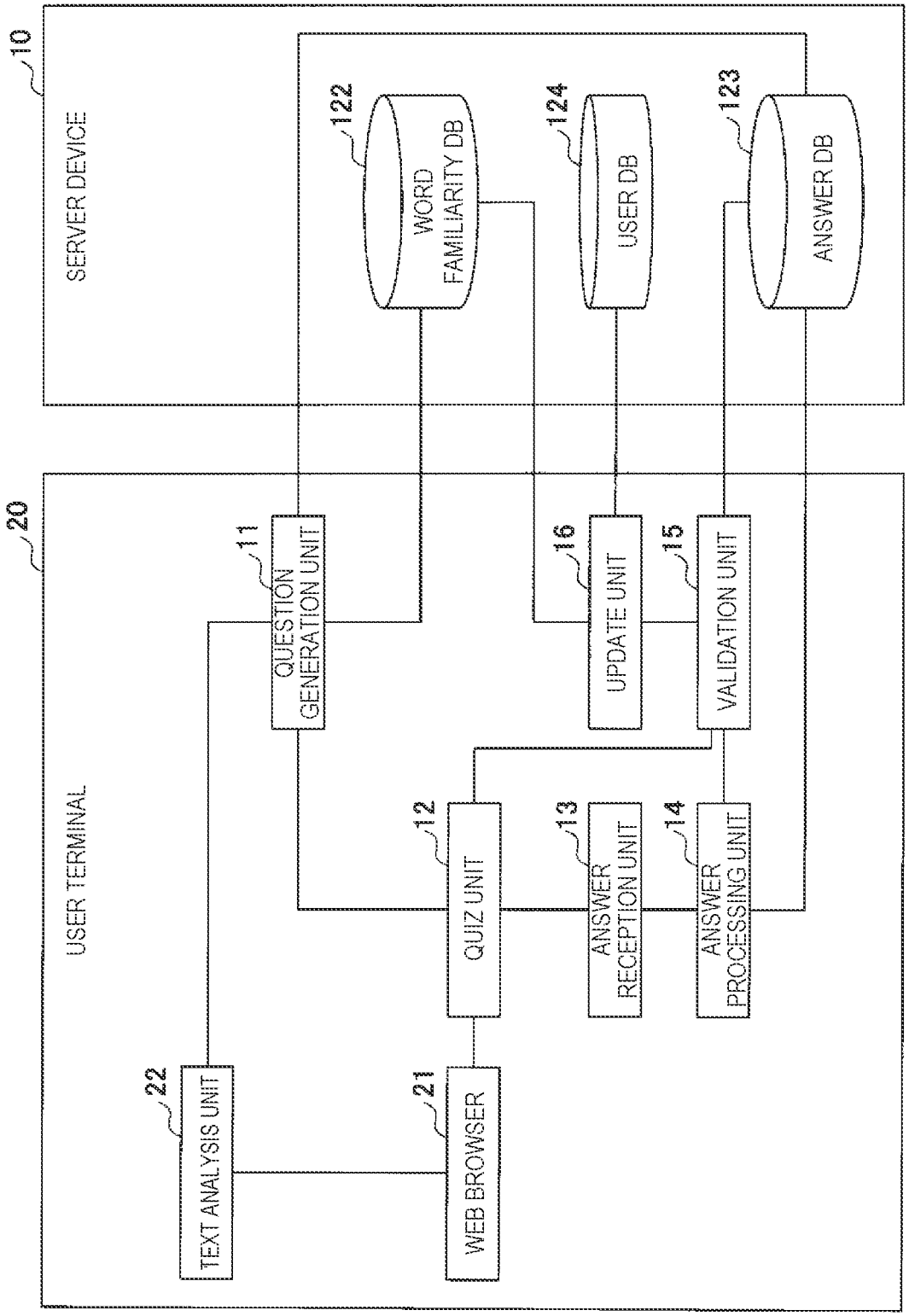
FIG. 11 is a diagram illustrating an example of a functional configuration of a user terminal 20 and the server device 10 according to the third embodiment.

FIG. 11 is a diagram illustrating an example of a functional configuration of the user terminal 20 and the server device 10 according to the third embodiment. In FIG. 11, portions that are the same as or corresponding to FIG. 6 are denoted with the same signs. In FIG. 11, the user terminal 20 includes the web browser 21 in addition to functions such as a text analysis unit 22, a question generation unit 11, a Quiz unit 12, an answer reception unit 13, an answer processing unit 14, a validation unit 15, and an update unit 16. These units are achieved by a process of causing the CPU of the user terminal 20 to execute one or more programs (for example, an add-on) installed in the user terminal 20. On the other hand, the server device 10 additionally uses a user DB 124. The user DB 124 is achievable using a component such as the auxiliary storage device 102 or a storage device connectible to the server device 10 over a network, for example.

Figure 12:
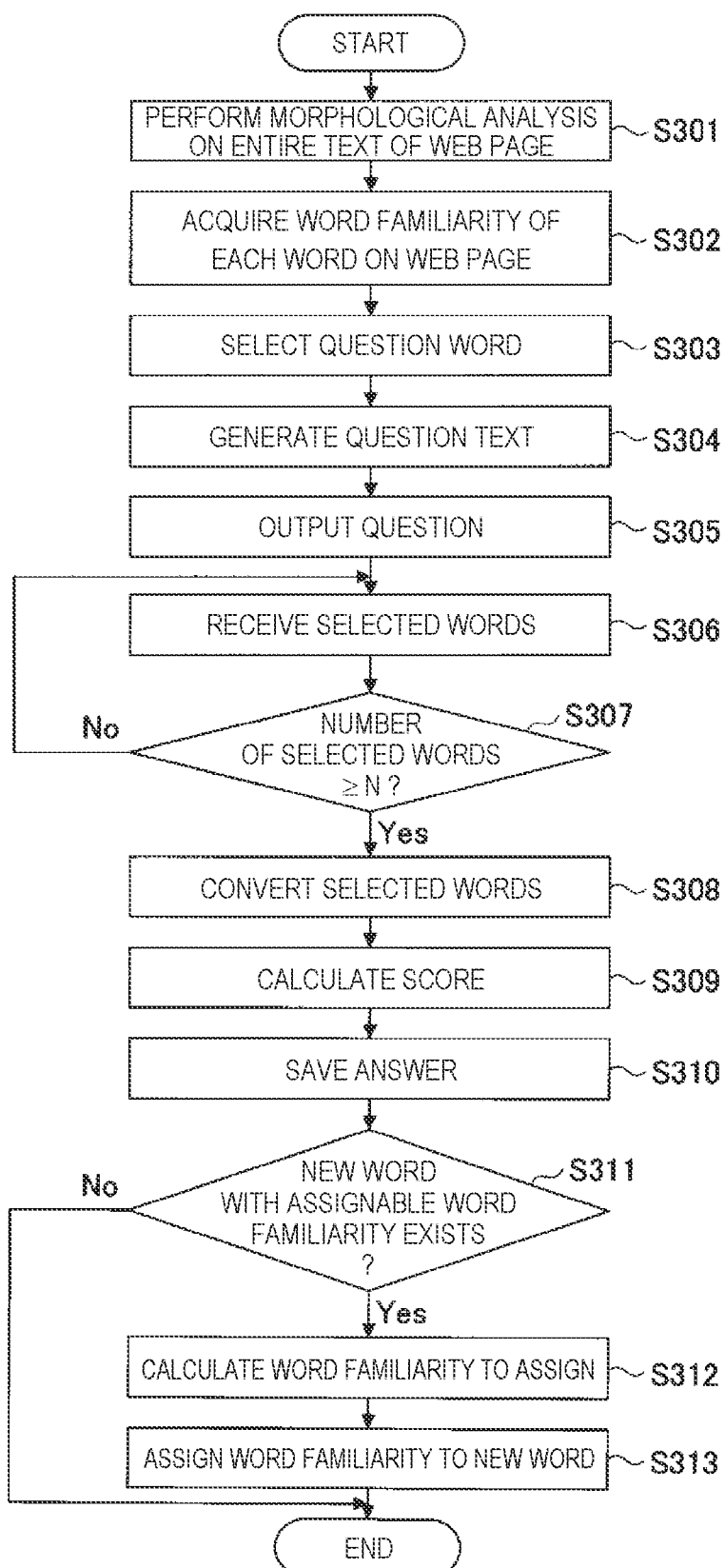
FIG. 12 is a flow hart for explaining an example of a processing procedure executed by the user terminal 20 in the third embodiment.

FIG. 12 is a flowchart for explaining an example of a processing procedure executed by the user terminal 20 in the third embodiment. The processing procedure in FIG. 12 is executed every time a web page is loaded by the web browser 21 (every time a web page is displayed by the web browser 21), for example. Alternatively, the processing procedure in FIG. 12 may be executed according to a predetermined operation by the user after a web page is displayed.

When the web page is displayed by the web browser 21, the text analysis unit 22 acquires a character string (the entire text) being displayed by the web page from the web browser 21, and executes morphological analysis for the acquired character string (S301). The text analysis unit 22 outputs the results of the morphological analysis (a morpheme group (word group)) to the question generation unit 11.

The question generation unit 11 accepts the input of the word group output from the text analysis unit 22, and acquires the word familiarity for each word included in the word group from the word familiarity DB 122 (S302). The word familiarities of new words in the word group are not registered in the word familiarity DB 122. Consequently, in step S302, it is sufficient to acquire the word familiarities for the existing words included in the word group.

Next, from the word group for which the word familiarity is acquired, the question generation unit 11 picks a word for which a score equal to or greater than a threshold value is acquirable, that is to say, a word that, if treated as a question word, has at least a certain number of words on the web page with a word familiarity close to the word treated as the question word (for example, a word having at least 10 words on the web page for which the difference in the word familiarity is less than 1) as the question word (S303). Next, the question generation unit 11 generates question text according to a method similar to step S104 in FIG. 7 (S304). The question generation unit 11 outputs the picked question word and question text to the quiz unit 12.

The quiz unit 12 accepts the input of the question word and the question text output from the question generation unit 11, and outputs a question according to a method such as overlaying (superimposing) the question onto the web page like the window w1 in FIG. 10 (S305), and additionally outputs the question word output from the question generation unit 11 to the answer reception unit 13. Note that the window w1 in FIG. 10 illustrates an example in which "kokusaiteki (international)" is the question word.

The user uses a mouse or the like to select a word felt to have the same degree of word familiarity as the question word from the entire text contained in the web page.

Every time a word is selected by the user (S306), the answer reception unit 13 determines whether or not the number of selected words has reached the number N sought as an answer (S307). If the number of selected words has reached N (S307, Yes), the answer reception unit 13 outputs the selection result (all of the selected words) and the question word output from the quiz unit 12 to the answer processing unit 14. Note that every time a word is selected by the user, the answer reception unit 13 may add the selected word to the window w1, and when the number of selected words reaches N, a grade button b1 may be displayed in the window w1 like the right side of FIG. 10. In this case, the answer reception unit 13 outputs all of the selected words and the question word output from the quiz unit 12 to the answer processing unit 14 in response to the pressing of the grade button b1.

Thereafter, steps S308 to S313 may be similar to steps S108 to S113 of FIG. 7. However, in the case where the score calculated in step S309 is a predetermined value or higher, the capturing of the question word by the user may be enabled. In this case, the update unit 16 may register the question word in the user DB 124 in association with a user ID of the user.

Note that in the third embodiment, some of the units included in the user terminal 20 may also be included in the server device 10. Also, an example is illustrated in which the entire text of a web page is used as the sentence of the question, electronic data such as text data other than a web page may also be used instead of a web page.

Next, a fourth embodiment will be described. In the fourth embodiment, the points that differ from the above embodiments will be described. Points not specifically mentioned in the fourth embodiment may be similar to the above embodiments.

Several types of questions other than prompting a user to choose words having a word familiarity close to the question word are conceivable as the question for determining the word familiarity. For example, the question generation unit 11 generates a question containing four existing words, one new word, and question text such as "Arrange the words in order of lowest word familiarity". By outputting the question, the quiz unit 12 prompts the user to perform a sort based on the magnitude relationships of the word familiarities felt by the user for the word group. The answer reception unit 13 receives the result of the sort by the user. The validation unit 15 validates the answer (sort result) from the user on the basis of factors such as whether or not the order of the existing words is correct in the order of words indicated by the sort result. In the case of determining that the answer is valid, the update unit 16 estimates that the word familiarity of the new word is between the word familiarities before and after the new word in the order. For example, the average of the word familiarities before and after may be determined as the word familiarity of the new word. The update unit 16 registers the determined word familiarity in the word familiarity DB 122 in association with the new word.

Next, a fifth embodiment will be described. In the fifth embodiment, the points that differ from the above embodiments will be described. Points not specifically mentioned in the fifth embodiment may be similar to the above embodiments.

In the above embodiments, whether the answer from a user is valid or not is determined for each question (each answer), but another conceivable method is to store user answers in the answer DB 123 for each user (or in association with a user ID) to thereby estimate the user trustworthiness, and change the answers used to determine the word familiarity (the selection result of selected words) on the basis of the trustworthiness.

For example, in the case where answers from a user A have an average score of 1.9 and answers from a user B have an average score of 1.4, the user A is considered to have a higher trustworthiness than the user B. In such a case, the validity of answers from the user A are determined to be high, and even if the score of a specific answer by the user A is less than the threshold value, the answer is used to assign the word familiarity to a new word or update the word familiarity of a question word. Meanwhile, even if the score of a specific answer by the user B is the threshold value or higher, the answer may not be used to assign the word familiarity to a new word or update the word familiarity of a question word.

In this case, in S110 of FIG. 7 or S310 of FIG. 12, the answer processing unit 14 saves a record additionally containing the user ID of the answering user in the answer DB 123. Also, the answer processing unit 14 extracts a record group containing the user ID of the record from the answer DB 123, computes an average value of the scores of the record group, and stores the average value in the auxiliary storage device 102 or the like in association with the user ID. With this configuration, the average value of the score (the score average) is stored for each user ID.

Also, in S111 of FIG. 7 or S311 of FIG. 12, the validation unit 15 loosens the condition that "the total number of answers having a score equal to or greater than the threshold value is α or greater (α≥1)" to a condition such as "the total number of answers having a score equal to or greater than the threshold value, or by a user whose score average is β or higher, is α or greater".

Note that in the above embodiments, an example in which word familiarity in the Japanese language is the predetermined index value is described for convenience, but the above embodiments may also be used to assign or update word familiarity in another language (for example, word familiarity in the English language). Furthermore, the above embodiments may also be used to determine (or estimate) an index value for words other than word familiarity. For example, with regard to word imagery (an index related to the ease of forming a mental image corresponding to the meaning of a word) or word difficulty, a quiz such as "Choose five words that are as easy to imagine as this word" may be used as a base to update the imagery data or word difficulty data for each word.

Also, in the above embodiments, an example in which questions are set in a quiz format is described for convenience, but answers from users may also be obtained by a format other than a quiz format.

As described above, according to the above embodiments, word familiarity assignment (assigning the word familiarity to new words and updating the word familiarity assigned to existing words) can be made more efficient (such as by lowering costs). As a result, the ongoing updating of word familiarity can be expected.

In the field of human computation research, research related to methods of manually performing work that cannot be automated by computers is being carried out, and methods of encouraging users to perform work by gamifying tasks (using fun as compensation) rather than using monetary compensation have been proposed. The above embodiments likewise conform to human computation techniques to gamify the work of assigning word familiarity, and can be expected to encourage many people to perform the work of assigning word familiarity without monetary compensation.

Note that in the above embodiments, the server device 10 or the user terminal 20 is an example of an index value assignment device. The quiz unit 12 is an example of a selection unit and a sort unit. The update unit 16 is an example of a determination unit.

Although embodiments of the present invention have been described in detail, the present invention is not limited to such specific embodiments, and various alterations and modifications are possible within the scope of the gist of the present invention stated in the claims.

REFERENCE SIGNS LIST 10 server device
11 question generation unit
12 quiz unit
13 answer reception unit
14 answer processing unit
15 validation unit
16 update unit
20 user terminal
21 web browser
22 text analysis unit
100 drive device
101 recording medium
102 auxiliary storage device
103 memory device
104 CPU
105 interface device
121 question DB
122 word familiarity DB
123 answer DB
124 user DB
B bus

The invention claimed is:

1. An index value assignment device comprising:
a selector configured to prompt a user to select, from a sentence, one or more words that the user feels to have a same degree of a predetermined index value with respect to at least a first word for which the index value is known;
a validator configured to validate the selection result by the user on a basis of the index value of a second word for which the index value is known from among the one or more words included in the selection result; and
a determiner configured to determine the index value with respect to a third word for which the index value is unknown from among the one or more words selected by the user, on a basis of the index value of the first word according to the selection result for which the selection result is determined to be valid.

2. An index value assignment device comprising:
a selector configured to prompt a user to select, from a sentence, one or more words that the user feels to have a same degree of a predetermined index value with respect to at least a first word for which the index value is known;
a validator configured to validate the selection result by the user on a basis of the index value of a second word for which the index value is known from among the one or more words included in the selection result; and
an updater configured to update the index value of the first word on a basis of the index value of the second word according to the selection result for which the selection result is determined to be valid.

3. The index value assignment device according to claim 1, wherein the index value includes a word familiarity or a word imagery.

4. The index value assignment device according to claim 1, wherein
the validator validates by comparing a score based on a sum of differences between the index value of the first word and the index value of the one or more second words to a threshold value.

5. The index value assignment device according to claim 4, wherein
the validator changes the selection result to use for validation on a basis of the score of the selection result for each user.

6. An index value assignment device comprising:
a sorter configured to prompt the user to sort a word group containing at least a first word for which a predetermined index value is known and a second word for which the index value is unknown on a basis of a magnitude relationship between the index values that the user feels for each word; and
a determiner configured to determine the index value of the second word on a basis of the known index values, including the known predetermined index value for the first word, of words before and after the second word in the sort result by the user.

7. The index value assignment device according to claim 2, wherein
the index value includes a word familiarity or a word imagery.

8. The index value assignment device according to claim 2, wherein
the validator validates by comparing a score based on a sum of differences between the index value of the first word and the index value of the one or more second words to a threshold value.

9. The index value assignment device according to claim 3, wherein
the validator validates by comparing a score based on a sum of differences between the index value of the first word and the index value of the one or more second words to a threshold value.

10. The index value assignment device according to claim 6, wherein
the index value includes a word familiarity or a word imagery.

11. The index value assignment device according to claim 6, wherein
the validator validates by comparing a score based on a sum of differences between the index value of the first word and the index value of the one or more second words to a threshold value.

12. The index value assignment device according to claim 7, wherein
the validator validates by comparing a score based on a sum of differences between the index value of the first word and the index value of the one or more second words to a threshold value.

13. The index value assignment device according to claim 8, wherein
the validator changes the selection result to use for validation on a basis of the score of the selection result for each user.

14. The index value assignment device according to claim 9, wherein
the validator changes the selection result to use for validation on a basis of the score of the selection result for each user.

15. The index value assignment device according to claim 10, wherein
the validator validates by comparing a score based on a sum of differences between the index value of the first word and the index value of the one or more second words to a threshold value.

16. The index value assignment device according to claim 11, wherein
the validator changes the selection result to use for validation on a basis of the score of the selection result for each user.

17. The index value assignment device according to claim 12, wherein
the validator changes the selection result to use for validation on a basis of the score of the selection result for each user.

18. The index value assignment device according to claim 15, wherein
the validator changes the selection result to use for validation on a basis of the score of the selection result for each user.

* * * * *